US008488476B2

(12) United States Patent
DelRegno et al.

(10) Patent No.: US 8,488,476 B2
(45) Date of Patent: Jul. 16, 2013

(54) PROVIDING APPLETS TO REMOTE DEVICES IN A COMMUNICATIONS NETWORK

(75) Inventors: Nick DelRegno, Rowlett, TX (US); Scott R. Kotrla, Wylie, TX (US); David E. McDysan, Great Falls, VA (US); Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); William Drake, Garland, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2459 days.

(21) Appl. No.: 10/859,057

(22) Filed: Jun. 2, 2004
(Under 37 CFR 1.47)

(65) Prior Publication Data
US 2005/0251858 A1  Nov. 10, 2005

Related U.S. Application Data

(60) Provisional application No. 60/560,009, filed on Apr. 5, 2004.

(51) Int. Cl.
*H04L 12/28* (2006.01)
*G06F 9/445* (2006.01)
*G06F 15/16* (2006.01)
*H04M 3/22* (2006.01)

(52) U.S. Cl.
USPC ........ 370/252; 370/254; 379/26.02; 717/177; 709/217

(58) Field of Classification Search
None
See application file for complete search history.

(56) References Cited

U.S. PATENT DOCUMENTS

| | | | | |
|---|---|---|---|---|
| 5,732,212 A | * | 3/1998 | Perholtz et al. | 709/224 |
| 5,960,204 A | * | 9/1999 | Yinger et al. | 717/176 |
| 6,185,586 B1 | * | 2/2001 | Judson | 715/207 |
| 6,286,041 B1 | * | 9/2001 | Collins et al. | 709/221 |
| 6,301,710 B1 | * | 10/2001 | Fujiwara | 717/175 |
| 6,324,690 B1 | * | 11/2001 | Luu | 717/177 |
| 6,381,645 B1 | | 4/2002 | Sassin | |
| 6,408,434 B1 | * | 6/2002 | Fujiwara | 717/170 |
| 6,609,081 B1 | | 8/2003 | De Varennes et al. | |
| 6,643,266 B1 | | 11/2003 | Pugaczewski | |
| 6,668,047 B2 | * | 12/2003 | Suzuki | 379/156 |
| 6,681,390 B2 | * | 1/2004 | Fiske | 717/173 |

(Continued)

FOREIGN PATENT DOCUMENTS

JP  2003-087291  7/2003

Primary Examiner — Gregory Sefcheck (57) ABSTRACT

System and method for providing applets to remote devices in a communications network. A preferred embodiment includes a host device, which is the device from which the applet will be transferred, and a target device, which is the device to which the applet will be transferred. In one embodiment, the host device autonomously determines that an applet is to be pushed to the target device. The host device then determines the address of the target device and transmits the applet to the target device. Instructions and commands may be sent to the target device form the host, and the target device may transmit results to the host device. In another embodiment, the target device is customer premise equipment and/or a user device that requests an applet from the host device. The target device requests applets, for example, to perform service parameter verification, performance monitoring, troubleshooting, or the like.

29 Claims, 6 Drawing Sheets

U.S. PATENT DOCUMENTS

| | | | |
|---|---|---|---|
| 6,886,029 B1* | 4/2005 | Pecus et al. | 709/203 |
| 7,017,155 B2* | 3/2006 | Peev et al. | 717/176 |
| 7,480,698 B2* | 1/2009 | Potter | 709/217 |
| 7,574,481 B2* | 8/2009 | Moore et al. | 709/217 |
| 2002/0032768 A1* | 3/2002 | Voskuil | 709/224 |
| 2002/0042911 A1* | 4/2002 | Harms | 717/173 |
| 2002/0124049 A1 | 9/2002 | Gorodetsky et al. | |
| 2002/0129129 A1* | 9/2002 | Bloch et al. | 709/220 |
| 2003/0145317 A1* | 7/2003 | Chamberlain | 717/177 |
| 2004/0098715 A1* | 5/2004 | Aghera et al. | 717/713 |
| 2006/0031042 A1* | 2/2006 | Ogura et al. | 702/184 |
| 2006/0168103 A1* | 7/2006 | Motoyama et al. | 709/217 |
| 2007/0226726 A1* | 9/2007 | Robsahm | 717/168 |
| 2012/0317227 A1* | 12/2012 | Bettinger | 709/217 |

* cited by examiner

PROVIDING APPLETS TO REMOTE DEVICES IN A COMMUNICATIONS NETWORK

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following applications, which are assigned to the assignee of the present application and incorporated herein by reference in their entireties:

U.S. patent application Ser. No. 10/858,502, filed Jun. 1, 2004 and entitled "System and Method for a Communications Access Network;"

U.S. patent application Ser. No. 10/858,501, filed Jun. 1, 2004 and entitled "System and Method for Controlling Communication Flow Rates;"

U.S. patent application Ser. No. 10/858,491, filed Jun. 1, 2004 and entitled "Apparatus and Method for Terminating Service Emulation Instances;"

U.S. patent application Ser. No. 10/858,503, filed Jun. 1, 2004 and entitled "Method and Apparatus for Processing Labeled Flows in a Communications Access Network;"

U.S. patent application Ser. No. 10/858,517, filed Jun. 1, 2004 and entitled "System and Method for Providing A Multiple-Protocol Crossconnect;"

U.S. patent application Ser. No. 10/858,868, filed concurrently herewith and entitled "System and Method for Monitoring, Controlling and Provisioning a Telecommunications Access Network;"

U.S. patent application Ser. No. 10/859,463, filed concurrently herewith and entitled "Error Detection and Reporting;"

U.S. patent application Ser. No. 10/859,468, filed concurrently herewith and entitled "Apparatus and Method for Testing and Fault Isolation in a Communication Network;" and U.S. patent application Ser. No. 10/858,525, filed on Jun. 1, 2004 and entitled "System and Method for Managing Communications In An Access Network."

TECHNICAL FIELD

The present invention relates generally to a system and method for controlling and maintaining remote network elements, and more particularly to a system and method for controlling and maintaining customer premise equipment from a remote location.

BACKGROUND

A commercial telecommunications network operated by a service provider typically supports voice and/or data communications between various customer locations served by the network. An overall communications system may be subdivided into an access network and a core network, which may or may not be owned and operated by different service providers. Generally, customer devices communicatively couple to the access network which, in turn, connects to the core network. The access network includes what many people refer to as "the last mile," that is, the connectivity from a customer location, such as an office building, to a point where a service provider has significant facilities, such as a metro hub or a "service edge" at the periphery of the core network.

In contrast to the access network, the core network usually provides transport of large aggregate flows over long distances and handles the selective routing of each customer's voice and data traffic to other locations served by the network.

The access network generally comprises a series of switches, aggregators, multiplexers, demultiplexers, routers, hubs, and the like which provide connectivity between the customer's equipment and the core network. In a complicated network architecture involving a large number and variety of equipment and a number of possible points of failure, it is helpful to a service provider to be able to quickly and efficiently isolate problems or failures in the network. Problems may include a failed piece of equipment, a cut cable, or the like. Many systems are currently employed by existing service providers to provide alarms or warnings when a piece of equipment fails or is suffering degraded performance and may be about to fail. The existing systems are generally focused on monitoring the operational status of the network equipment, such as the switches, aggregators, multiplexors, demultiplexors, routers, amplifiers, and the like located in the service provider's facilities or collocated at facilities operated by a telephone company. These systems, however, fail to provide a means to diagnose or troubleshoot problems and monitor performance of customer premise equipment.

For example, a communications link between a particular piece of customer premise equipment and an access device may be causing failures within the network. When a customer suffers interrupted or poor service and contacts then service provider to report the problem, the service provider may be able to verify the working condition of the access network and core network. Beyond that, the service provider must frequently dispatch service personnel to go to the customer's site to perform tests and troubleshoot the problem. This can be an expensive and time-consuming process.

Accordingly, there is a need for a system and method for troubleshooting problems with customer premise equipment and the communications links between the customer premise equipment and the access network. In addition, there is a need for a system and method for gathering information from, and performing tests and other functions on, customer premise equipment.

SUMMARY OF THE INVENTION

These and other problems are generally solved or circumvented, and technical advantages are generally achieved, by preferred embodiments of the present invention that provide the ability to perform troubleshooting and gather information regarding network elements.

In accordance with a preferred embodiment of the present invention, a method and an apparatus for pushing and invoking an applet from a host device to a target device is provided. The method and apparatus generally provide the ability for the host device to determine that an applet is to be pushed to a target device. The address of the target device is determined, and the applet is pushed to the target device. Thereafter, the host device may cause the applet to perform testing or analysis and the results reported to the host device.

In accordance with another preferred embodiment of the present invention, a method and an apparatus for providing applets to a target device for performing troubleshooting, performance monitoring, or the like is provided. The method and apparatus generally provides applets useful in controlling and maintaining customer premise equipment and user devices in a telephony network. The applets may be retrieved from a host device via the telecommunications links upon a user command or some predetermined event.

Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely, providing troubleshooting and data gathering capabilities to customer premise equipment, e.g., a router or a workstation, interconnected by Ethernet links. The invention may also be applied, however, to other types of devices and other types of communications links, such as, for example, a serial link, a parallel link, another network link, a direct connection, or the like. Furthermore, while specific access networks are illustrated and discussed herein, it is noted that network configurations may vary to include fewer or additional elements, such as routers, gateways, bridges, ATM switches, frame relay switches, firewalls, switches, and the like. The illustrated embodiments are provided for illustrative purposes only and are provided only to aid in the explanation and understanding of the concepts of the present invention. Accordingly, aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
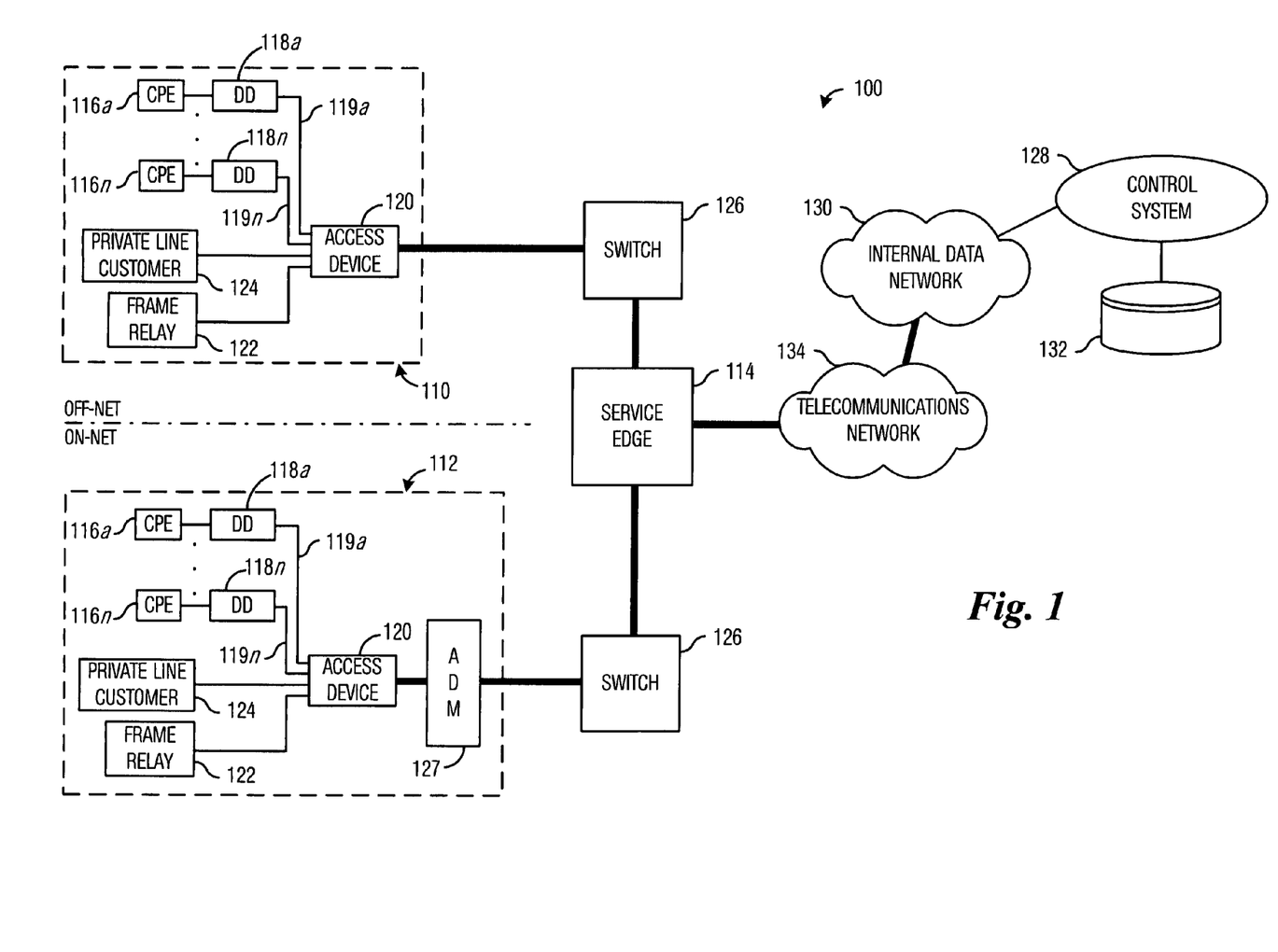
FIG. 1 is a network diagram of an access network embodying features of the present invention.

Referring now to FIG. 1, reference numeral 100 designates an access network diagram embodying features of an exemplary embodiment of the present invention. It should be noted that the network diagram 100 has been simplified to better illustrate features of the present invention. Well-known elements have not been shown, but are nonetheless part of a communications system embodying features of the present invention. For example, a network embodying the present invention may include amplifiers, power supplies, switches, bridges, ATM switches, frame relay switches, gateways, routers, firewalls, additional core network elements, and the like.

The access network diagram 100 illustrates one embodiment of an access network in which customer premise equipment (CPE), such as CPE 116a . . . 116n located in office buildings 110 and 112, may connect to a service edge 114. It should be noted that the illustrated embodiment is discussed in terms of an office building for illustrative purposes only. Office buildings 110, 112 represent customers requiring communication/data services via the access network 100. In other embodiments, office buildings 110, 112 may be a single-dwelling house, an apartment complex, a multi-tenant building, a single-tenant building, a corporate or institutional campus, or the like.

Furthermore, the service edge 114 is illustrated as a single network element for illustrative purposes only, and may include two or more network elements. Likewise, the communications path between the buildings 110, 112 and the service edge 114 is illustrated as a simple two-hop connection for illustrative purposes only. The communications path between buildings 110, 112 and the service edge 114 may contain additional or fewer hops, and may include different paths for unidirectional traffic associated with either direction of a bi-directional path.

Typically, each of the CPE 116a . . . 1116n comprise a router coupled to other devices such as other routers, hubs, workstations, or the like. Typically, it is expected that the CPE 116a . . . 116n is customer-owned equipment comprising a router or a firewall. Workstations, personal computers, or other user devices may communicatively couple to the router or firewall to access the service edge 114.

In a typical embodiment, it is expected that each floor in office buildings 110, 112 or each customer (or some other means for division) may have a demarcation device (DD) 118a . . . 118n that is communicatively coupled to CPE 116a . . . 116n, respectively. Depending upon the height of the building and the lengths of the wire runs, additional components, such as repeaters and amplifiers, may be required. The demarcation devices 118a . . . 118n represent the extremities of the access network 100 and the point at which the customer connects to the access network 100. The service provider is responsible for transport traffic and maintaining network operation from this point onward towards network 134.

The demarcation devices 118a . . . 118n are communicatively coupled to an access device 120, which provides switching and access services to the CPE 116a . . . 116n, via links 119a . . . 119n, respectively. A typical connection between the demarcation devices 118a . . . 118n and the access device 120 includes Ethernet via 100BT, 100FX, GbE, VDSL, or the like. In other embodiments, the access device 120 may be capable of coupling to other types of devices. For example, a customer may operate a frame relay CPE device 122 which carries on frame relay communications with an access device, often via a DS1 connection thereto. Other customers, such as a private line customer 124, may also require a DS1 connection. Other types of connections may be used as required to support specific customers needs.

On the network side, the access device 120 is preferably communicatively coupled to one or more hubs or switches, represented by switch 126 in FIG. 1, to provide connectivity between the office buildings 110, 112 and the service edge 114. The communications link between the access device 120 and the switch 126 may be, for example, a DS3 link. Preferably, the access device 120 also provides aggregation and translation services between the CPE 116a . . . 116n and the access network. As noted above, customers within a building may require different types of access, or a single customer may require different types of access for different services. In these situations, it is preferred to utilize an access device that is capable of providing translation services between multiple formats dependent upon the customer requirements to a format suitable for transmission in the access and core networks.

One such access device 120 is disclosed in U.S. patent application Ser. No. 10/858,503, entitled "Method and Apparatus for Processing Labeled Flows in a Communications Access Network", which is incorporated herein by reference. An example of a switch that may be used in accordance with one embodiment of the present invention is disclosed in U.S. patent application Ser. No. 10/858,517, entitled "System and Method for Providing A Multiple-Protocol Crossconnect", which is incorporated herein by reference. Other access devices and switches may be used.

Additional network elements may be positioned between the access device 120 and the switch 126. For example, in an "on network" scenario, i.e., the access network is owned by the service provider, an add/drop multiplexor (ADM), such as ADM 127, may be utilized. Frequently, service is provided to a building via an OCn link, such as an OC12 or OC48 optical link, but the access device, such as the access device referred to above, is equipped with a smaller link, such as a DS3 link. Accordingly, the ADM 127 provides a mechanism for the DS3 traffic from the access device to be separated from and interjected onto the larger OCn link. It should be noted that the "off network" scenario frequently does not require additional equipment at the customer's site. One reason for this is that the communications link from the access network is generally leased as a DS3. The leased DS3 may then couple directly to the access device. An ADM or other suitable element (not shown) may be provided in the access network as needed.

A control system 128 and an internal data network (IDN) 130 provide management and control connectivity, preferably via the telecommunications network 134. It should be noted that the IDN 130 is physically implemented as a collection of interconnected network nodes, such as switches, bridges, ATM switches, frame relay switches, multiplexers, de-multiplexers, routers, and the like. It should also be noted that the IDN 130 may actually be implemented within or overlapping the telecommunications network 134, but are shown here as two logically distinct networks for illustrative purposes. Accordingly, the configuration and implementation of the IDN 130 may vary, but is simplified for illustrative purposes only.

The control system 128 is also communicatively coupled to a control database 132 to provide storage for and access to network topology, status information, operating parameters, and the like. The control database 132 may be a separate, stand-alone database system or integrated into the control system 128. The control database 132 may comprise memory, a hard drive, a storage system, or the like. Furthermore, the control database 132 may be centralized in a single location or distributed amongst a number of locations.

Figure 2:
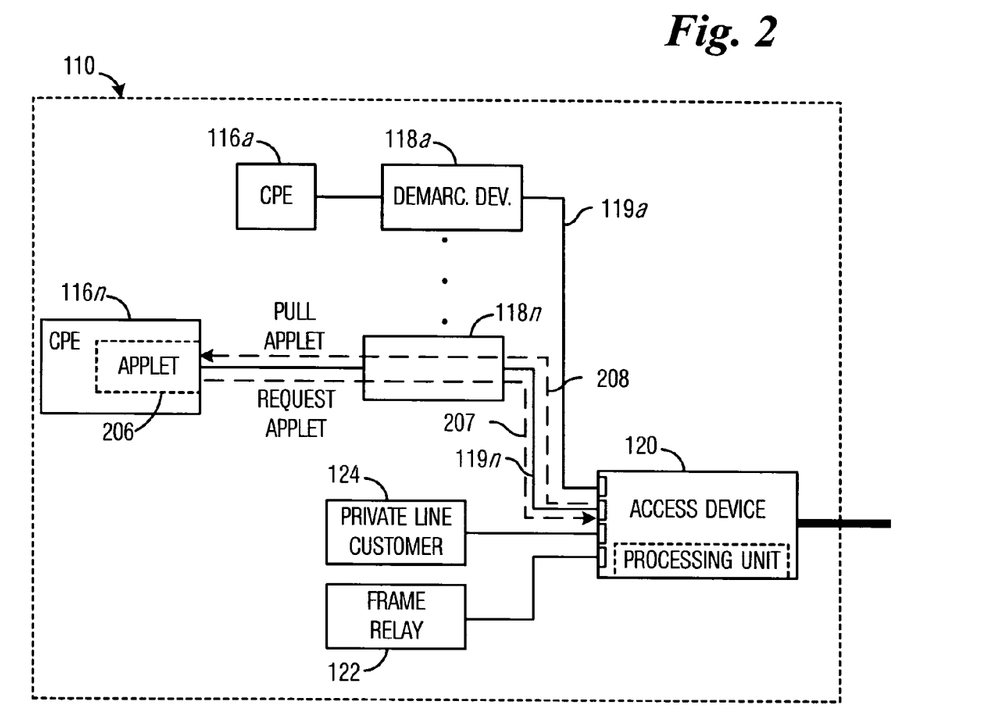
FIG. 2 is a connectivity diagram illustrating pulling an applet to a piece of customer premise equipment in accordance with one embodiment of the present invention.

Referring now to FIG. 2, pulling an applet 206 to a target device from a host device is illustrated in accordance with one embodiment of the present invention. Generally, pulling an applet involves a target device requesting or retrieving one or more applets from a host device. The target device may request or retrieve the applet automatically upon some event or upon a user command or request.

In FIG. 2, the target device, such as the CPE 116n within building 110, is the device that is pulling the applet 206. The host device, such as the access device 120, is the device from which the target device is pulling the applet. It should be noted that the following description illustrates embodiments of the present invention in which the target device is the CPE 116n within building 110 for illustrative purposes only. The description is similar for building 112 and other target devices, such as the frame relay 122, the private line customer 124, or a user device communicatively coupled to the CPE, frame relay, or private line customer. It should also be noted that the description that follows discusses embodiments of the present invention in which the communications links are Ethernet links and network nodes are addressable by IP addresses. Other embodiments may utilize other types of links and communications protocols. For example, embodiments of the present invention may be utilized to pull applets to the frame relay 122 and private line customer 124.

The CPE 116n submits a request 207, as illustrated by the dashed line, to the host device, such as the access device 120. The request 207 notifies the target device that a remote device desires to download an applet, such as applet 206, and preferably includes the IP address of the target device. In response the host device transmits the requested applet to the target device.

As illustrated in FIG. 2, the applet 206 is preferably pulled to the CPE 116n over existing communications links such as communications link 119n. The applet 206 is preferably a transportable module of software code that may be executed by a wide variety of platforms. Due to their device independence and wide acceptance, JAVA or HTML are preferred languages for generating the applet 206. In this manner, the applet 206 may be downloaded to many platforms. Other languages, however, may be used. For example, C, C++, or other programming or scripting languages may be used. In these alternative embodiments, care must be taken to ensure that the target platform, e.g., the CPE 116n, is capable of executing the applet 206.

The applet 206 may be pulled to the CPE 116n from the demarcation device 118n, the access device 120, the control system 128 (FIG. 1), the switch 126 (FIG. 1), a test device (not shown) coupled to a network element, or other network elements. In the embodiment illustrated in FIG. 2, the applet 206 is illustrated as being pulled from the access device 120 for illustrative purposes only, and in the preferred embodiment, the applet 206 is pulled from a central location, such as the control system 128 (FIG. 1) or some other central location, via the access device 120. It is preferred that one or more central locations be utilized as a host device. In this manner, a single copy may be retrieved from many target devices. In some embodiments, it may be desirable to have several distributed host devices. It should be noted that in any of these embodiments, it is preferred that the existing networks and communications links be utilized to pull the applet to the CPE 116n, as opposed to a separate communications link. A separate communications link, wireline or wireless, may be utilized but may involve additional equipment or incur additional costs.

It should be noted that, depending on implementation, embodiments of the present invention may allow a user or operations personnel capabilities not available in the prior art. For example, users or operations personnel are able to download applets from a service provider, preferably from a central networked location, to troubleshoot problems in the connectivity between the user's device and the access network. Users or operations personnel are also able to verify that the service is provisioned correctly and to monitor performance to determine if problems exist, if additional services (e.g., bandwidth) are needed, if fewer services are needed, or the like. These types of capabilities, among others, at this location in the network were not previously available.

Figure 3:
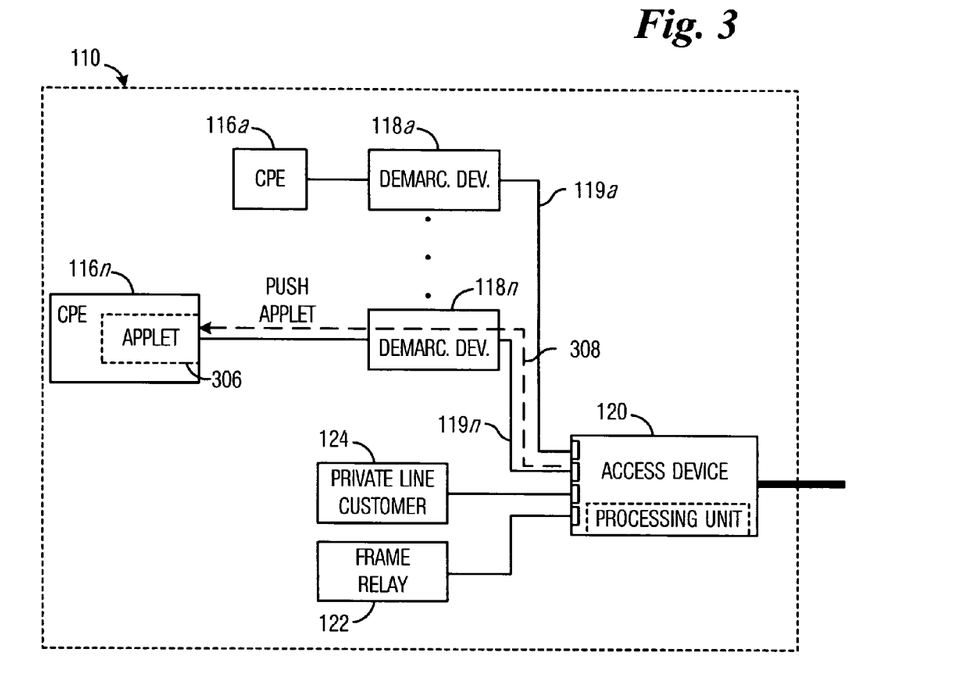
FIG. 3 is a connectivity diagram illustrating pushing an applet to a piece of customer premise equipment in accordance with one embodiment of the present invention.

Referring now to FIG. 3, the pushing of an applet 306 to a target device from a host device is illustrated in accordance with one embodiment of the present invention. Push technology involves the ability for a network device, such as the demarcation device 118n, the access device 120, the control system 128 (FIG. 1), the switch 126 (FIG. 1), a test device (not shown), or the like, to autonomously initiate transfer of an applet to another device, and to invoke or control the execution of the applet without human intervention. For example, the host device may initiate transfer of an applet to a target device upon the occurrence of a predetermined event, a predetermined time or time interval, an event occurring on the host device, or the like. The pushed applet 306 is essentially an extension of the host device, providing the host device with capabilities not available in the prior art.

As illustrated by the dashed line 308, an applet 306 is preferably pushed to the CPE 116n over the existing communications links. The applet 306 may be pushed to the CPE 116n from the demarcation device 118n, the access device 120, the control system 128 (FIG. 1), the switch 126 (FIG. 1), a test device (not shown) coupled to a network element, or other network element. In the embodiment illustrated in FIG. 3, the applet 306 is illustrated as being pushed from the access device 120 for illustrative purposes only, and in the preferred embodiment, the applet 306 is pushed from a central location, such as the control system 128 (FIG. 1), via the access device 120.

It should be noted that the service provider will likely need appropriate privileges in order to push the applet 306 to the CPE 116n. This may be accomplished by at least two methods. First, the CPE 116n may be a managed CPE, meaning that the service provider is responsible for managing the CPE 116n. In these situations, the service provider typically has administrative privileges on the CPE 116n, allowing the service provider to configure and gain remote access to the CPE 116n. Second, the customer may grant the service provider access to the CPE 116n by, for example, assigning a user account having the appropriate privileges to the service provider. Other methods may be used.

Unlike troubleshooting functions and utilities that may be pre-programmed into remote equipment during manufacture or installation, applets deployed from a service provider to remote equipment on an "as-needed" basis allows for ensuring the applet code is of the latest version. Moreover, such functions or utilities may be crafted in an ad hoc manner to fit a particular situation and immediately downloaded and engaged at remote equipment. The ability to push applets also allows a service provider to perform tests, troubleshooting and monitoring at any time of day and without requiring the customer personnel or service provider personnel to physically load any software or firmware into a target device. An additional benefit of deploying applet code as needed relates to reducing the memory/storage burden of the remote element of storing the applet code during times when the code is not in use.

Figure 4:
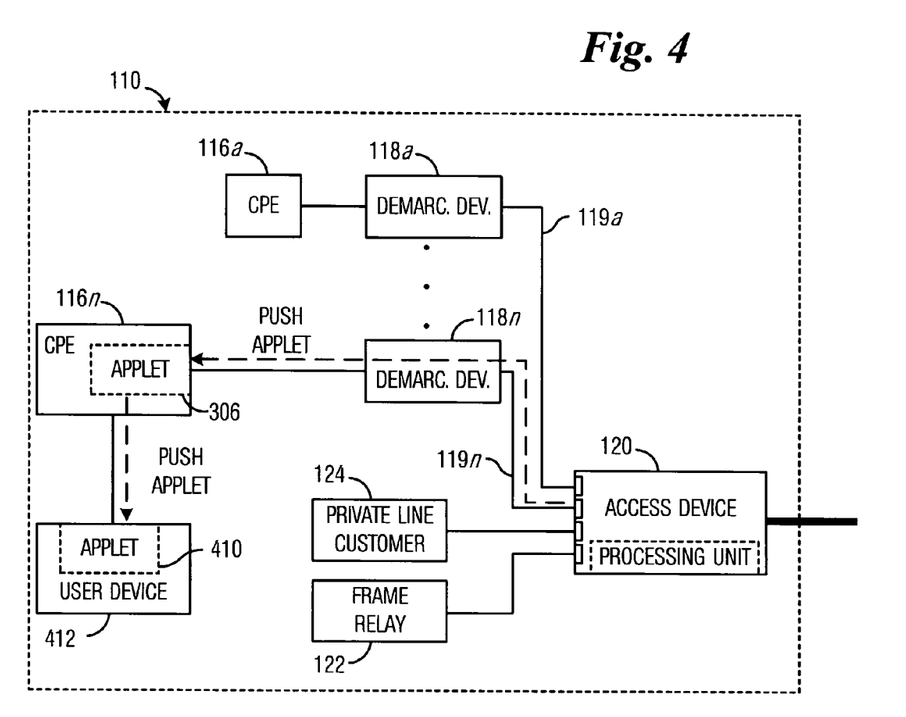
FIG. 4 is a connectivity diagram illustrating pushing an applet to a user device in accordance with one embodiment of the present invention.

FIG. 4 illustrates another embodiment of the present invention in which a second applet 410 is pushed to a user device 412. The user device 412 may be a workstation, personal computer, router, hub, switch, or the like. In one embodiment, the second applet 410 is pushed to the user device 412 from the CPE 116n. In this embodiment, the first applet 306 pushes the second applet 410 upon a predefined event, such as a detection of an error condition, occurrence of routine maintenance activity, or the like, or upon an instruction received from the host device, such as the control system 128, switch 126, access device 120, test device (not shown), or the like. Thereafter, communications, e.g., instructions and test/performance results, may be communicated between the user device 412 and the host device.

In another embodiment, the control system 128, or other host device, may push the second applet 410 directly to the user device 412. It should be noted that this embodiment implies that the control system 128 has knowledge of the user devices coupled to the CPE 116n, statically or dynamically. In a situation in which the CPE 116n and/or the user device 412 are managed devices, the control system 128 is likely to have knowledge of the customer's network. In other embodiments, the customer's network may be determined dynamically. For example, the CPE 116n may be configured, e.g., via the first applet 306, to inform the control system of devices coupled to the CPE 116n. The control system 128 may then push the applets to the desired user devices.

Once pushed, the first applet 306 and the second applet 410 provide control and maintenance capabilities to the CPE 116n and user device 412 that were not previously available. It should be appreciated that embodiments of the present invention allow operations and maintenance personnel the ability to troubleshoot equipment, monitor performance, and test communications to the point at which the customer connects to the access networks. Additionally, in situations in which the user allows the access provider access to the user device 412, the operations and maintenance personnel can perform the same functionality to the user device, thereby having visibility into the entire network from the user device 412 to the service edge 114 (FIG. 1).

For example, upon notification of a problem or during normal maintenance procedures, the control system 128, for example, may push the applet 306 to the CPE 116n. The applet 306 may then perform predetermined procedures or await instructions from the control system 128. The procedures may perform a wide variety of tests, such as connectivity tests, message error tests, performance monitoring, or the like, to assist in troubleshooting the problem, something that was previously unavailable. Previously, as discussed above, a service provider would have to dispatch a truck and personnel to the customer's site if a problem arose, involving additional expenses and delays.

Furthermore, the applet 306 may be configured to either push the applet 410 to the user device 412 or to notify the host device of the user device's IP address, thereby allowing the host device to push the applet 410 directly to the user device 412. In this manner, the service provider is able to perform tests and collect information regarding the user device 412.

Figure 5:
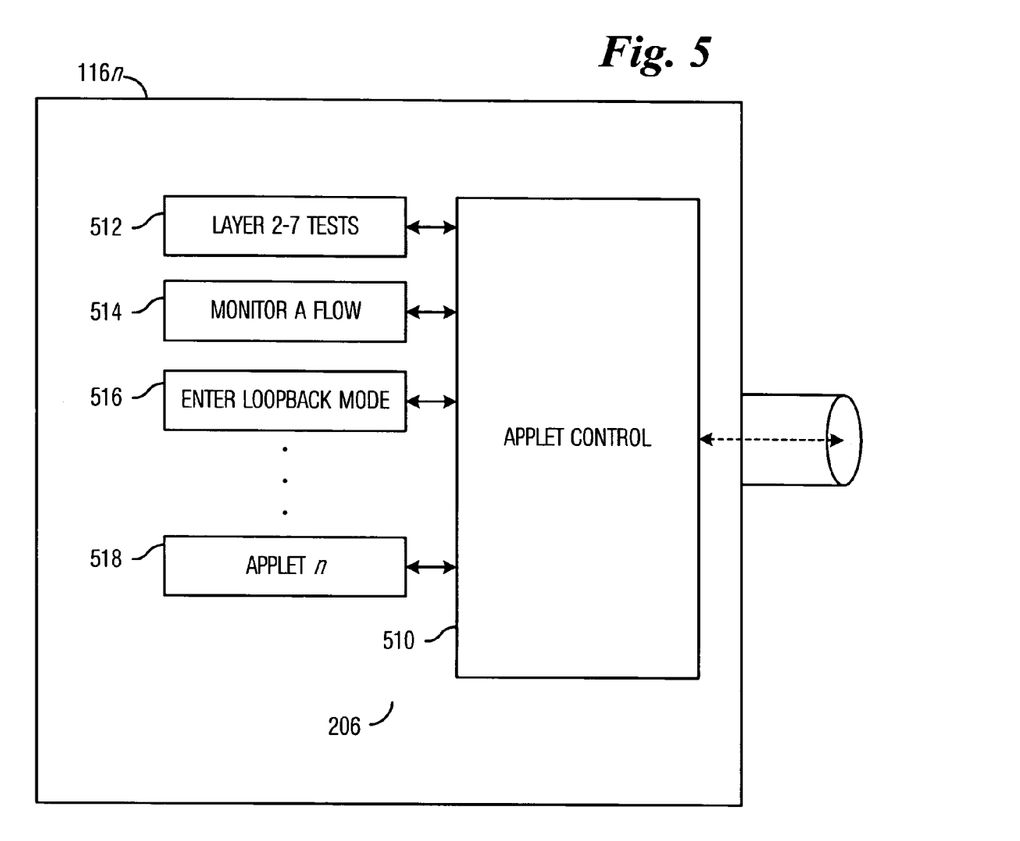
FIG. 5 is a block diagram illustrating a structure of an applet in accordance with one embodiment of the present invention.

FIG. 5 illustrates a structure of an applet that may be used in accordance with embodiments of the present invention. As illustrated, applet 206 (also representative of applet 306 shown earlier) is preferably implemented as multiple applets or may contain multiple functions, any one or more of which may be invoked by the user (pull) or a host device (push). The applet 206 preferably includes an applet control 510 that is responsible for communications to the host device and providing control of individual functions or applets, such as, for example, OSI layer 2-7 test applet 512, monitor a flow applet 514, loopback mode applet 516, or the like.

The functions that the applet 206 may perform are varied. For example, applet 206 may be designed to perform OSI layers 2-7 loopback and message tests, to transmit known test messages and bit patterns, to collect performance messages, to collect and filter messages based on specific conditions and addresses, to trap messages based on specific conditions and addresses, to collect data over a period of time, to collect layer 1 statistics, to collect usage information for specific communications links and/or flows, and the like, are particularly useful. Furthermore, if the hardware is configured accordingly, the applet 206 may be utilized to activate a layer 1 loopback test as well.

It should be noted that the applet 206 is illustrated as multiple distinct and separate functions or applets for illustrative purposes only. The applet control 510 may be combined with one or more of the applets (e.g., applets 512-518) into a single executable, or may be separated as illustrated in FIG. 5.

One advantage of utilizing separate applets is the ability to limit the size of the applet that must be transferred from the host device to the target device. The applet control 510 may be transferred to the target device once. Thereafter, smaller applets for specific tests or functionality, which may be smaller, may be transferred to the target device on an as needed basis.

Figure 6:
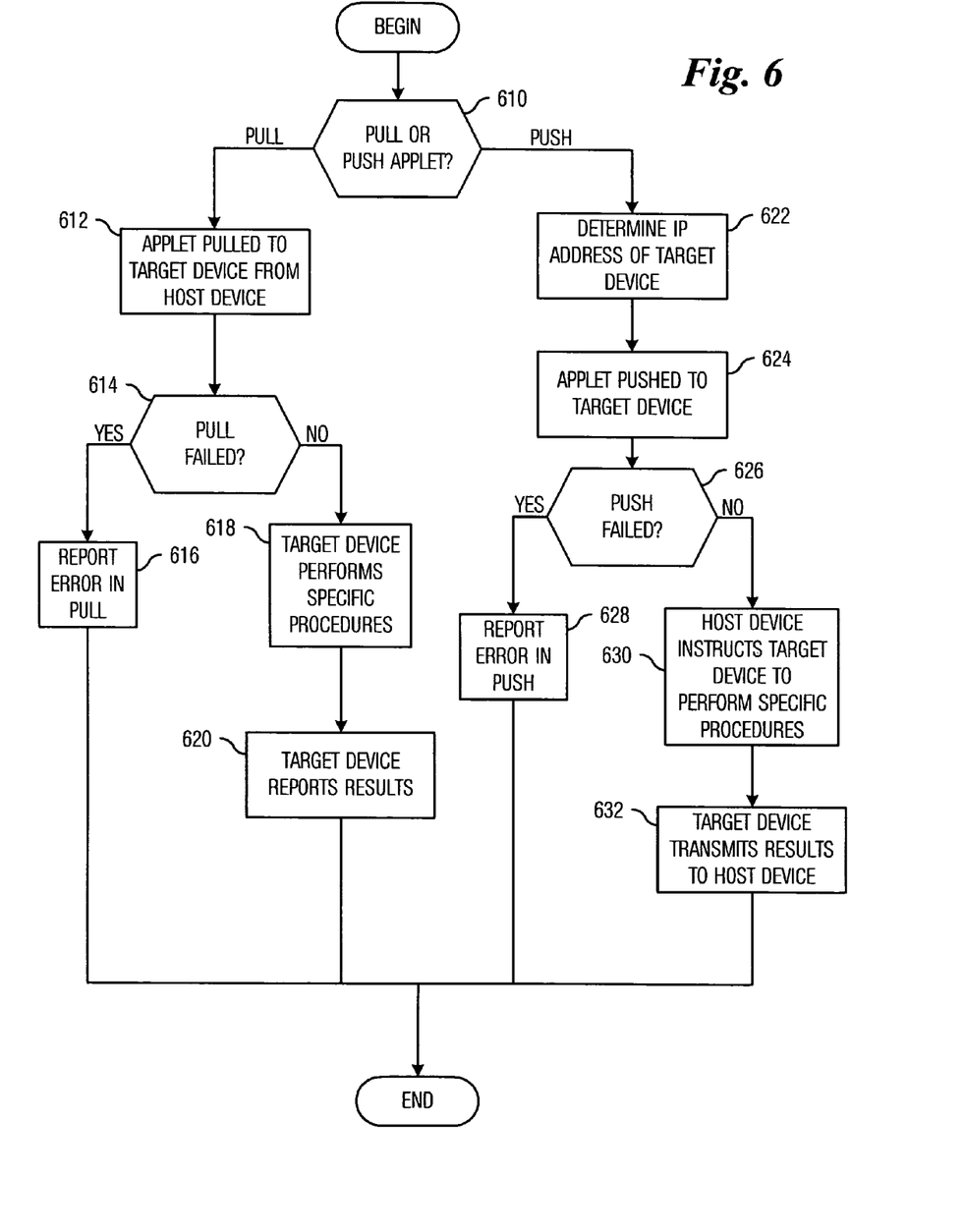
FIG. 6 is a flow chart depicting steps that may be performed to push an applet to a remote device.

Referring now to FIG. 6, a process that may be performed to push an applet to or pull an applet from a target device, such as the CPE 1116n or user device 412, is illustrated. The process begins in step 610 wherein a determination is made whether or not a push or a pull operation is performed. A pull operation may be invoked by either a customer or operations personnel. In one embodiment, a customer may pull an applet to verify service characteristics, available bandwidth, network connectivity, perform routine maintenance, or the like. In another embodiment, operations personnel may be on-site and may want to pull applets from a central location to perform specific tests, such as, for example, loopback tests, message tests, connectivity tests, service checks, or the like.

If a pull operation is being performed, processing proceeds to step 612, wherein the target device accesses the host device to retrieve the applet. In step 614, a determination is made whether or not the pull operation failed. If the pull operation was not successful, then an error is reported in step 616. The pull operation may be unsuccessful due to the host device not responding, faulty equipment, checksums or some other error checking mechanism failed, a cut cable, or the like. If the pull operation was successful, processing proceeds to step 618, wherein the target device performs one or more procedures included in the applet. Upon completion, the target device reports the results of the applet. Results may be reported to a host device or a user, stored for future retrieval, or the like.

In an alternative embodiment, an applet may be pulled down automatically upon a predetermined event. For example, the target device may be configured to monitor the status of a communications link. If an error condition occurs or falls below a threshold, the target device may be configured to pull an applet for automatically performing diagnostic tests and reporting the results to a user or operations personnel. If a diagnostic test failed, the target device may be configured to automatically generate an alarm.

If, in step 610, a determination is made that a push operation is being performed, then processing proceeds to step 622, wherein the IP address of the target device is determined. In one embodiment, the IP address is retrieved from a database, such as, for example, control database 132 (FIG. 1). In this embodiment, the IP addresses of the target devices are known or accessible to the host device. Upon determining that an applet is to be pushed to a target device, the host device accesses the database and retrieves the appropriate IP address, which may then be used in subsequent steps to communicate with the target device. In another embodiment, the IP address is dynamically determined via another network device. For example, in the scenario depicted in FIG. 2, the applet 206 is to be pushed to the CPE 116n. The access device 120 is preferably aware of the IP address of the CPE 116n for routing purposes. In this embodiment, the access device 120 provides the IP address of the CPE 116n to the host device, such as the control system 128.

Next, in step 624, the applet is pushed from a host device to the target device. As discussed above, the host device may be, for example, the access device 120, the control system 128 (FIG. 1), the switch 126 (FIG. 1), a test device (not shown) or the like, and the target device may be, for example, the CPE 116n, the user device 412, or the like. Next, in step 626, a determination is made whether or not the push failed. One of the embodiments of the present invention is to use the push technology to troubleshoot or diagnose problems, or to verify service connectivity. It is possible that problems may exist that prevent an accurate push of the applet (either the first applet 306 or the second applet 410) from being pushed to the target device accurately. In these situations, it is desired that the applet be verified for accuracy, and if an error is detected, the error be reported as indicated in step 628.

If the download was successful, then processing proceeds to step 630, wherein the host device instructs the target device to perform specific procedures. The procedures may comprise any functionality of which the target device is capable. For example, in one embodiment of the present invention, the host device may instruct the target device to perform a logical loopback of layer 2-7 messages, transmit test messages or predefined bit patterns, transmit configuration or performance information, collect and transmit usage information over a period of time, or the like. After the target device has performed the requested operations, the target device is preferably instructed to transmit the results of the procedures to the host device.

The push and pull applet described herein may perform various functions. For example, teachings of the present invention may be utilized to perform a ping test that performs an ICMP or UDP ping to a specified address. The test generates ICMP or UDP ping packets as instructed by the user. Test instructions that are provided to the applet include the number of packets to be sent, the type of ping, the IP address that the packets are to be sent to and the amount of time to wait for a reply. The applet then replies with results of the ping test which can include round trip delay to the specified IP address, the number of errored packets and the IP address which returns the response.

Another applet may be utilized is a Traceroute Test that performs an IP traceroute to a specified address. The Traceroute Test performs an ICMP ping to a defined IP address but sets the Time To Live for the packets to one, then two, etc. to determine the devices between the applet and the end point. The applet returns the results of the Traceroute Test including the IP address of the device responding to each ping, and the Round Trip Delay to the device.

Yet another applet is a voice quality test that may simulate VoIP traffic and analyze the quality of the voice conversation. The applet generates a known voice pattern and a device at the other side of the flow perfoms analysis on the received packets to determine things such as packet loss, delay and jitter. The device then sends a known voice pattern to the applet and the applet repeats the analysis process. An indication of overall voice quality is then reported by each end of the test.

Yet another applet is a LAN analysis applet that performs analysis of traffic across a LAN. The applet may measure things such as throughput, collisions, top talkers, errored frames. The applet is installed on the LAN and monitors traffic passing on the LAN.

Yet another applet is a WAN analysis applet that performs analysis of traffic across a WAN. The applet may measure things such as throughput, collisions, top talkers, errored frames. The applet is installed on the WAN and monitors traffic passing on the WAN. This capability can be used to augment or replace monitoring capabilities on the WAN devices.

Yet another applet is a performance analysis applet that captures performance counts for a specific OSI layer (1-7). This may require the capability in the hardware or software to support these capabilities. A software version of a protocol analyzer is included in the applet. Various traps and triggers can be set and specific data or specific conditions can be captured and sent to a remote location for analysis.

Yet another applet is an applet for generating traffic. The applet may generate traffic at layer 1-7 of the OSI Reference Model. The generated traffic may be analyzed at a receiving network element. The applet has the ability to generate various types of traffic including specifying addresses, headers, etc.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the functions performed by the applet may vary while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of performing procedures on a target device, the method comprising:
   autonomously determining, by a host device, that an applet is to be pushed to the target device based at least in part on a time period or an event occurring on the host device;
   determining the address of the target device in a network;
   establishing a communications link between a host device and the target device;
   pushing the applet to the target device from the host device, the applet having one or more functions;
   transmitting instructions to the applet to perform a first function; and
   receiving results of the first function from the target device.

2. The method of claim 1, wherein the predetermined event is a failure condition.

3. The method of claim 1, wherein the target device is customer premise equipment or a user device.

4. The method of claim 1, wherein the host device is an access device, a control system, a switch, or a test device.

5. The method of claim 1, wherein the target device is addressable by an IP address.

6. The method of claim 1, wherein one or more functions include at least one of a connectivity test, a layer 2 loopback test, a layer 3 loopback test, a layer 4 loopback test, a layer 5 loopback test, a layer 5 loopback test, a layer 6 loopback test, a layer 7 loopback test, a service verification test, a message test, performance tests, a ping test, a traceroute test, a voice quality test, a LAN analysis test, a WAN analysis test, a traffic generation function, and a performance analysis function.

7. In a telecommunications network, a method of performing procedures on a target device located on customer premises from a remote location, the method comprising:
   determining by a host device that a first event has occurred, the first event indicating that an applet is to be pushed to the target device, wherein determining is performed without receiving a request from the target device for the applet;
   determining the address of the target device in the telecommunications network;
   establishing a communications link through one or more network elements between the host device and the target device;
   transmitting the applet to the target device from the host device, the applet having one or more functions;
   transmitting instructions to the applet to perform a first function; and
   receiving results of the first function from the target device.

8. The method of claim 7, wherein the first event is one of a predetermined event, a time period, or an event occurring on the host device.

9. The method of claim 8, wherein the predetermined event is a failure condition.

10. The method of claim 6, wherein the target device is customer premise equipment or a user device.

11. The method of claim 6, wherein the host device is an access device, a control system, a switch, or a test device.

12. The method of claim 6, wherein the target device is addressable by an IP address.

13. The method of claim 6, wherein one or more functions include at least one of a connectivity test, a layer 2 loopback test, a layer 3 loopback test, a layer 4 loopback test, a layer 5 loopback test, a layer 5 loopback test, a layer 6 loopback test, a layer 7 loopback test, a service verification test, a message test, performance tests, a ping test, a traceroute test, a voice quality test, a LAN analysis test, a WAN analysis test, a traffic generation function, and a performance analysis function.

14. A host device in a telecommunications network, the host device being communicatively coupled to at least one target device, the host device including a computer readable medium for storing a computer program executed on a computer, the computer program comprising:
   computer program code for autonomously determining, by a host device, that an applet is to be pushed to the target device based at least in part on a time period or an event occurring on the host device computer program code for determining the address of the target device in a network;

computer program code for establishing a communications link between a host device and one or more target devices;

computer program code for pushing the first applet to the target device from the host device, the applet having one or more functions;

computer program code for transmitting instructions to the applet to perform a first function; and computer program code for receiving results of the first function from the target device.

15. The host device of claim 14, wherein the event is a failure condition.

16. The host device of claim 14, wherein the target device is customer premise equipment or a user device.

17. The host device of claim 14, wherein the host device is an access device, a control system, a switch, or a test device.

18. The host device of claim 14, wherein the target device is addressable by an IP address.

19. The host device of claim 14, wherein one or more functions include at least one of a connectivity test, a layer 2 loopback test, a layer 3 loopback test, a layer 4 loopback test, a layer 5 loopback test, a layer 5 loopback test, a layer 6 loopback test, a layer 7 loopback test, a service verification test, a message test, performance tests, a ping test, a traceroute test, a voice quality test, a LAN analysis test, a WAN analysis test, a traffic generation function, and a performance analysis function.

20. A host device in a telecommunications network, the host device being communicatively coupled to at least one target device, the host device including a computer readable medium for storing a computer program, the computer program comprising:

computer program code for determining by a host device that a first event has occurred, the first event indicating that an applet is to be pushed to the target device, wherein determining is performed without receiving a request from the target device for the applet;

computer program code for determining the address of the target device in the telecommunications network;

computer program code for establishing a communications link through one or more network elements between the host device and the target device;

computer program code for transmitting the applet to the target device from the host device, the applet having one or more functions;

computer program code for transmitting instructions to the applet to perform a first function; and computer program code for receiving results of the first function from the target device.

21. The host device of claim 20, wherein the first event is one of a predetermined event, a time period, or an event occurring on the host device.

22. The host device of claim 21, wherein the predetermined event is a failure condition.

23. The host device of claim 19, wherein the target device is customer premise equipment or a user device.

24. The host device of claim 19, wherein the host device is an access device, a control system, a switch, or a test device.

25. The host device of claim 19, wherein the target device is addressable by an IP address.

26. The host device of claim 19, wherein one or more functions include at least one of a connectivity test, a layer 2 loopback test, a layer 3 loopback test, a layer 4 loopback test, a layer 5 loopback test, a layer 5 loopback test, a layer 6 loopback test, a layer 7 loopback test, a service verification test, a message test, performance tests, a ping test, a traceroute test, a voice quality test, a LAN analysis test, a WAN analysis test, a traffic generation function, and a performance analysis function.

27. A method comprising:

autonomously determining by a host device that an applet is to be pushed to a target device based on a time period;

pushing the applet to the target device from the host device, the applet having one or more functions;

transmitting instructions to the applet to perform a function; and receiving results of the function from the target device.

28. The method of claim 27, wherein the determining is performed without receiving a request from the target device for the applet.

29. An apparatus including a computer readable medium for storing a computer program executed on a computer, the computer program comprising:

computer program code for autonomously determining, by a host device, that an applet is to be pushed to the target device based on a time period;

computer program code for pushing the applet to the target device from the host device, the applet having one or more functions;

computer program code for transmitting instructions to the applet to perform a function; and computer program code for receiving results of the function from the target device.

* * * * *